(12) United States Patent
Noda

(10) Patent No.: US 6,241,883 B1
(45) Date of Patent: Jun. 5, 2001

(54) VEHICLE FUEL SUPPLYING APPARATUS

(75) Inventor: Koji Noda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/486,231

(22) PCT Filed: Jun. 30, 1998

(86) PCT No.: PCT/JP98/02938

§ 371 Date: Feb. 24, 2000

§ 102(e) Date: Feb. 24, 2000

(87) PCT Pub. No.: WO00/00734

PCT Pub. Date: Jan. 6, 2000

(51) Int. Cl.⁷ .......................... F02M 37/22; F02M 37/04; B01D 35/027
(52) U.S. Cl. ............................ 210/172; 210/196; 210/97; 210/416.4; 123/509
(58) Field of Search .......................... 210/416, 4, 258, 210/257.1, 172, 196, 97; 123/509

(56) References Cited

U.S. PATENT DOCUMENTS

| | | |
|---|---|---|
| 2,367,055 * | 1/1945 | Rike et al. . |
| 3,020,950 * | 2/1962 | Schraivogel . |
| 3,049,171 * | 8/1962 | Neuerburg et al. . |
| 3,726,310 * | 4/1973 | Coscia . |
| 3,729,273 * | 4/1973 | Shimrony . |
| 3,900,397 * | 8/1975 | Bell . |
| 4,397,333 * | 8/1983 | Liba et al. . |
| 4,503,885 * | 3/1985 | Hall . |
| 4,747,388 * | 5/1988 | Tuckey . |
| 4,842,006 * | 6/1989 | Scheurenbrand et al. . |
| 4,886,031 * | 12/1989 | Scheurenbrand et al. . |
| 4,899,784 * | 2/1990 | Woodgate et al. . |
| 5,029,611 * | 7/1991 | Sasaki . |
| 5,084,166 | 1/1992 | Shiraga et al. . |
| 5,186,152 * | 2/1993 | Cortochiato et al. . |
| 5,395,520 * | 3/1995 | Ito et al. . |
| 5,584,988 * | 12/1996 | Hashimoto et al. . |

FOREIGN PATENT DOCUMENTS 1-37178 * 9/1989 (JP) .

* cited by examiner

Primary Examiner—Thomas M. Lithgow
(74) Attorney, Agent, or Firm—Sughrue, Mion, Zinn, Macpeak & Seas, PLLC

(57) ABSTRACT

In order to solve a problem that, under the condition that an amount of the residual fuel within a fuel reservoir is small, the fuel within the fuel reservoir is biased by a swing motion of the fuel caused by an abrupt acceleration or an abrupt braking of an automotive vehicle so that the amount of the fuel in the vicinity of a suction port of the fuel pump is deficient and a sufficient amount of fuel may not be supplied to an engine, an outlet port of a return piping for returning into the fuel reservoir extra fuel from a pressure regulator, out of the fuel to be fed under pressure through the pressure regulator from an interior of the fuel reservoir by the fuel pump is disposed within a sub-tank, and the extra fuel is directed and close to the suction port of the fuel pump.

15 Claims, 5 Drawing Sheets

VEHICLE FUEL SUPPLYING APPARATUS

TECHNICAL FIELD

This invention relates to an in-tank type fuel feeding device for an automotive vehicle, which comprises: a sub-tank provided in a fuel reservoir; a fuel pump for feeding under pressure fuel within the fuel reservoir through a pressure regulator toward an engine; and a return piping for returning extra fuel from the pressure regulator to the fuel reservoir, in order to avoid a phenomenon that the fuel within the fuel reservoir is biased on one side by a swing motion or the like so that the fuel is not provided around a suction port of the fuel pump.

BACKGROUND TECHNOLOGY

FIG. 11 is, for example, a cross-sectional view, which is disclosed in Japanese Utility Model Publication No. Hei 1-37178 issued on Nov. 9, 1989, and shows a fuel feeding device for an automotive vehicle, which is assembled through a set plate from a bottom side of a fuel reservoir.

In the drawing, reference numeral 1 denotes a fuel reservoir, character 1a denotes an opening portion formed in a bottom surface of the fuel reservoir 1, numeral 2 denotes fuel, numeral 3 denotes a set plate mounted oil-tightly so as to hermetically close the above-described opening portion 1a, numeral 4 denotes a fuel pump provided in the set plate 3 in advance for feeding under pressure the fuel 2 within the fuel reservoir 1 to the engine, and numeral 5 denotes a sub-tank provided in the set plate 3 in advance for being positioned in a suitable position within the fuel reservoir 1 in order to avoid a phenomenon that the fuel 2 within the fuel reservoir 1 is biased on one side by a swing motion or the like so that the fuel 2 is not provided around a suction port 4a of the fuel pump 4. A shape of the sub-tank 5 shown in the figure is a cup-shaped with a communication hole (not shown) having a small diameter in a lower portion of a side wall thereof so that the fuel is introduced therethrough.

This sub-tank 5 is mounted on an inner surface side of the set plate in advance so that it is located in a suitable position within the fuel reservoir 1. The in-tank type fuel pump 4 is mounted within the sub-tank 5 together with a suction side filter 6 mounted on its suction port.

Reference numeral 6 denotes the suction side filter mounted so as to cover the suction port 4a of the fuel pump 4, numeral 7 denotes a joint pipe, and numeral 8 denotes an oil feeding piping for feeding out the fuel 2 to the fuel reservoir 1 oil-tightly through the set plate 3 from an outlet 4b of the fuel pump 4. Reference numeral 10 denotes an oil feeding pipe 10, numeral 11 denotes a fuel filter inserted on the downstream side of the oil feeding pipe 10 for filtrating dust of the fuel 2 to be fed, numeral 12 denotes an injector for injecting the fuel to each cylinder of the engine (not shown), and numeral 13 denotes a pressure regulator for adjusting the pressure of the fuel 2 to be fed to the injector 12 to a constant level.

Also, numeral 14 denotes a return piping for collecting the fuel 2, which is excessive upon the pressure adjustment, from the pressure regulator 13 again to the fuel reservoir 1. This return piping 14 extends from the pressure regulator 13 with its outlet port being open within the fuel reservoir 1 oil-tightly through the set plate 3.

Incidentally, numeral 15 denotes an electric power connector provided oil-tightly to the set plate 3 and connected to an electric power feeding terminal 4c of the fuel pump 4 to feed the electric drive power of the fuel pump 4.

As described above, in the conventional fuel feeding device for an automotive vehicle, under the condition that an amount of the fuel 2 within the fuel reservoir 1 is reduced, in order to again feed, back to the engine, the fuel 2 that has been returned back to the fuel reservoir 1 through the return piping 14, the fuel 2 collected in the fuel reservoir 1 is caused to flow into the sub-tank 5 through the communication hole (not shown) having a small diameter, and in addition, the fuel has to reach the suction port 4a of the fuel pump 4. Such a detour has to be taken. As a consequence, if the fuel within the fuel reservoir 1 is biased on one side by the swing motion or the like, the fuel 2 adjacent to the suction port 4a of the fuel pump 4 would be insufficient so that it is impossible to sufficiently feed the fuel to the engine, disadvantageously.

Also, in general, since the sub-tank 5 is formed into a cup shape whose top surface is opened, the fuel 2 within the sub-tank 5 is caused to ride over the side wall of the sub-tank 5 to the outside upon the swing motion when the vehicle is slanted, abruptly accelerated or abruptly braked. Thus, there is a possibility that the fuel 2 adjacent to the suction port 4a of the fuel pump 4 is insufficient so that it is impossible to sufficiently feed the fuel 2 to the engine.

In particular, although the fuel consumption rate is increased upon the acceleration of the vehicle, if the fuel supply amount would be insufficient at this time, there is also a problem that the drivability of the vehicle would be seriously affected.

DISCLOSURE OF THE INVENTION

In order to overcome such a problem, an object of this invention is to provide a fuel feeding device for an automotive vehicle, which stably feeds an extra fuel collected from a pressure regulator 13 through a return piping even if the fuel is biased due to a swing motion upon a rapid acceleration or a rapid braking of the vehicle when the amount of the fuel within a fuel reservoir is consumed.

According to a first aspect of this invention, in a fuel feeding device for an automotive vehicle comprising: a sub-tank provided within a fuel reservoir for avoiding the shortage of fuel in the vicinity of a suction port of a fuel pump, resulting from the fuel within the fuel reservoir is biased on one side by a swing motion or the like; a fuel pump for feeding under pressure the fuel within the fuel reservoir through a pressure regulator on an engine side; and a return piping for returning extra fuel from the pressure regulator to the fuel reservoir, an outlet port of the return piping and a suction port of the fuel pump are disposed within the sub-tank, and the outlet port of the return piping is provided so that the extra fuel is guided and directed to the suction port of the fuel pump.

According to a second aspect of this invention, in a fuel feeding device for an automotive vehicle comprising: a sub-tank provided within a fuel reservoir for avoiding the shortage of fuel in the vicinity of a suction port of a fuel pump, resulting from the fuel within the fuel reservoir is biased on one side by a swing motion or the like; a fuel pump for feeding under pressure the fuel within the fuel reservoir through a pressure regulator on an engine side; a return piping for returning extra fuel from the pressure regulator to the fuel reservoir; and a set plate disposed in advance so that the sub-tank and the fuel pump are positioned at appropriate positions within the fuel reservoir and mounted from a bottom surface side of the fuel reservoir, an outlet port of the return piping is disposed on the set plate from the bottom surface side of the fuel reservoir to face an interior of the fuel reservoir, the outlet port of the return piping and the suction port of the fuel pump are disposed within the sub-tank, and the outlet port of the return piping is provided so that the extra fuel is guided and directed to the suction port of the fuel pump.

According to the fuel feeding device for an automotive vehicle of a third aspect of this invention, in the fuel feeding device for an automotive vehicle according to the first aspect of this invention, a flow guide means for guiding the extra fuel to the suction port of the fuel pump is provided at the outlet port of the return piping.

According to the fuel feeding device for an automotive vehicle of a fourth aspect of this invention, in the fuel feeding device for an automotive vehicle according to the second aspect of this invention, a flow guide means for guiding the extra fuel to the suction port of the fuel pump is provided at the outlet port of the return piping.

According to the fuel feeding device for an automotive vehicle of a fifth aspect of this invention, in the fuel feeding device for an automotive vehicle according to the first aspect of this invention, a part of a pipe wall side portion of the return piping is cut out and the pipe is bent on the side of the side wall portion so that the outlet port of the return piping is directed to guide the extra fuel to the outlet port of the fuel pump.

According to the fuel feeding device for an automotive vehicle of a sixth aspect of this invention, in the fuel feeding device for an automotive vehicle according to the second aspect of this invention, a part of a pipe wall side portion of the return piping is cut out and the pipe is bent on the side of the side wall portion so that the outlet port of the return piping is directed to guide the extra fuel to the outlet port of the fuel pump.

According to the fuel feeding device for an automotive vehicle of a seventh aspect of this invention, in the fuel feeding device for an automotive vehicle according to the first aspect of this invention, a lateral outlet port directed to guide the extra fuel to the suction port of the fuel pump is provided in a pipe wall side portion adjacent to the outlet port of the return piping, and the outlet port of the return piping is closed.

According to the fuel feeding device for an automotive vehicle of an eighth aspect of this invention, in the fuel feeding device for an automotive vehicle according to the second aspect of this invention, a lateral outlet port directed to guide the extra fuel to the suction port of the fuel pump is provided in a pipe wall side portion adjacent to the outlet port of the return piping, and the outlet port of the return piping is closed.

According to the fuel feeding device for an automotive vehicle of a ninth aspect of this invention, in the fuel feeding device for an automotive vehicle according to the third aspect of this invention, the flow guide means is provided inside of a suction side filter formed so as to cover the suction port of the fuel pump.

According to the fuel feeding device for an automotive vehicle of a tenth aspect of this invention, in the fuel feeding device for an automotive vehicle according to the fourth aspect of this invention, the flow guide means is provided inside of a suction side filter formed so as to cover the suction port of the fuel pump.

BEST MODE FOR CARRYING OUT THE INVENTION

Figure 1:
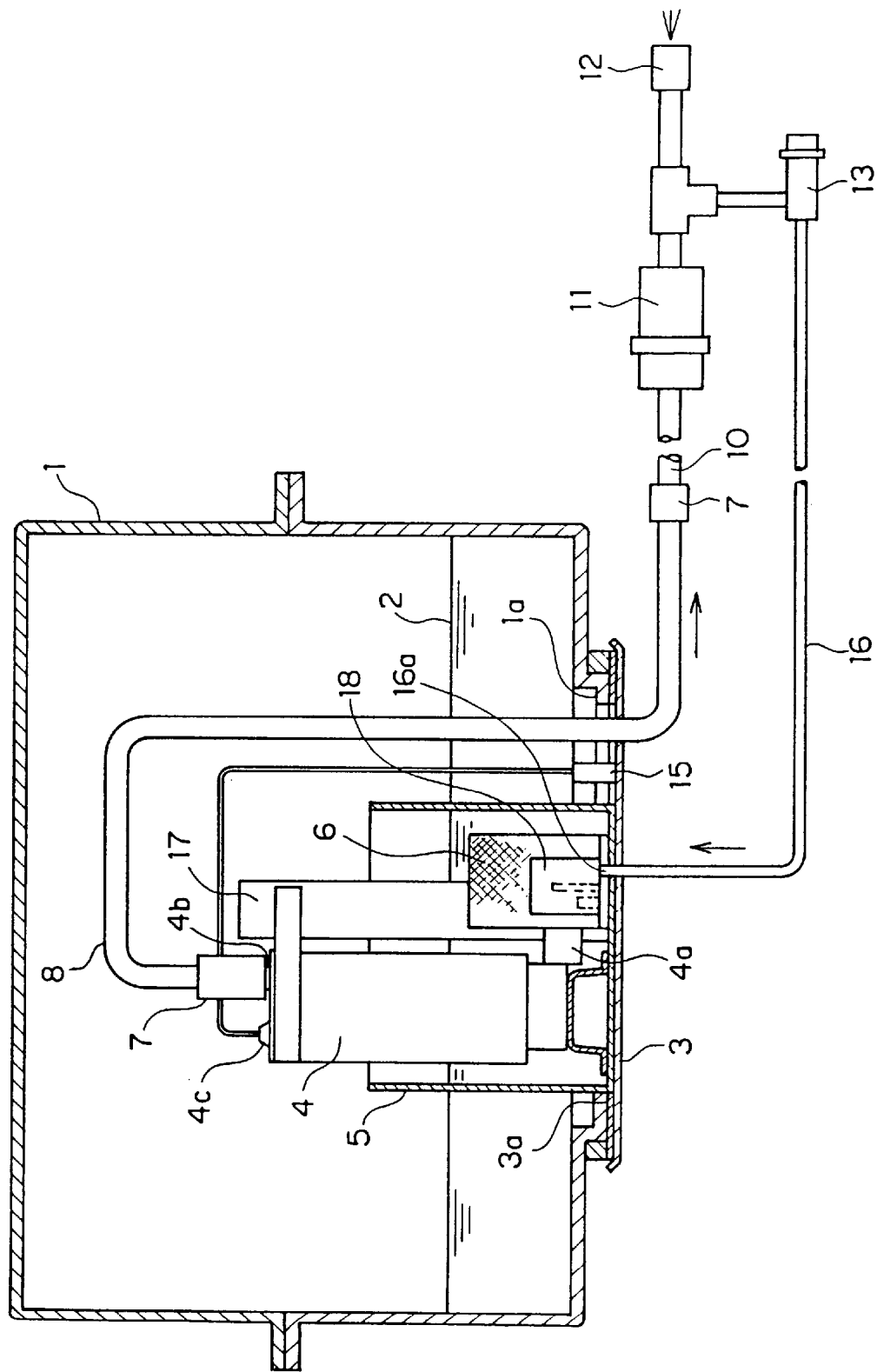
FIG. 1 is a side elevational view showing a fuel feeding device for an automotive vehicle according an embodiment 1.

Embodiments of this invention will now be described in detail with reference to the drawings.

Embodiment 1

According to an embodiment 1 shown in FIGS. 1 to 4, an in-tank type feeding device for an automotive vehicle is provided with a sub-tank 5 provided within a fuel tank 1 for avoiding a phenomenon that fuel 2 within a fuel reservoir 1 is biased on one side by a swing motion or the like to reduce the fuel 2 adjacent to a suction port 4a of a fuel pump 4 for feeding the fuel 2 within the fuel reservoir 1 on the side of an engine (not shown) through a pressure regulator 13 under pressure, a return piping 16 for returning extra fuel from the pressure regulator 13 to an interior of the fuel reservoir 1, and a set plate 3 disposed in advance so that a sub-tank 5 and the fuel pump 4 are positioned at appropriate positions within the fuel reservoir 1 mounted from the side of a bottom surface of the fuel reservoir 1. An outlet 16a of the return piping 16 is disposed in the set plate 3 from the side of the bottom surface of the fuel reservoir 1 so as to face the interior of the fuel reservoir 1. The outlet 16a of the return piping 16 and the suction port 4a of the fuel pump 4 are arranged in the sub-tank 5. The outlet 16a of the return piping 16 is directed so as to guide the extra fuel to the suction port 4a of the fuel pump 4. Furthermore, a flow guide means 18 is provided to the outlet 16a of the return piping 16 for guiding the extra fuel to the suction port 4a of the fuel pump 4.

Incidentally, reference numerals 1 to 13 and 15 in the drawing are used to denote the same components as those of the above-described conventional device, and explanation therefor will be omitted. Numeral 17 denotes a pillar fixed to the set plate 3 for fixing the fuel pump 4 in place.

By the way, the return piping designated by the reference numeral 16 in the figure is a pipe disposed for collecting the extra fuel which is excessive when the pressure adjustment is performed for the pressure regulator 13, i.e., the return fuel to the fuel reservoir 1. This return piping 16 extends from the pressure regulator 13, passes oil-tightly through the set plate 3, and the terminal portion of the return piping is somewhat projected from the bottom surface of the fuel reservoir 1, i.e., the set plate 3 so that the outlet 16a, i.e., the terminal outlet opened to the axial end of the return piping faces the interior of the sub-tank 5 within the fuel reservoir 1. The extra fuel is guided and directed to the suction port 4a of the fuel pump 4.

Figure 2:
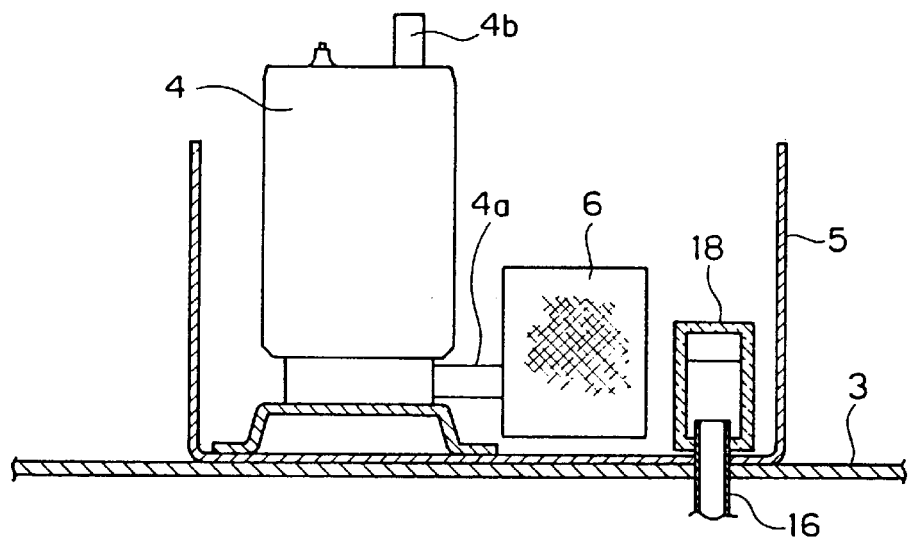
FIG. 2 is an enlarged view of a detail of the fuel feeding device for an automotive vehicle according to the embodiment 1.
Figure 3:
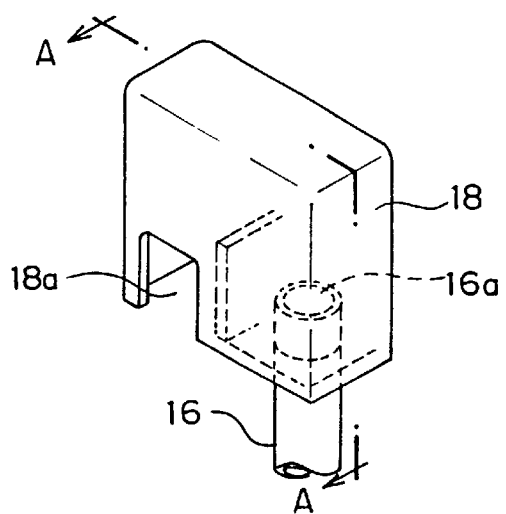
FIG. 3 is a perspective view showing a flow guide means according to the embodiment 1.
Figure 4:
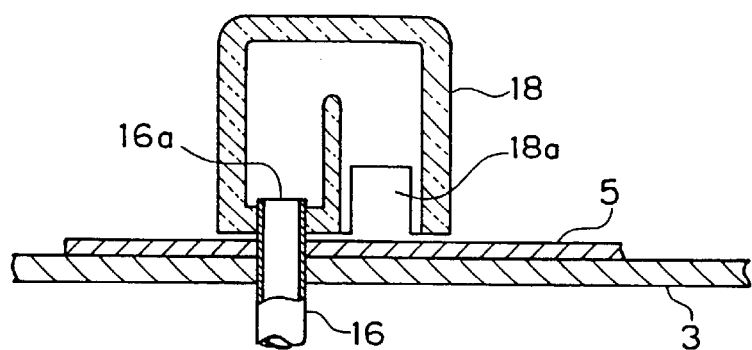
FIG. 4 is a cross-sectional view taken along line A—A of FIG. 3.

A flow guide means 18 is a means for guiding the extra fuel, flowing from the outlet 16a of the return piping 16, to the suction port 4a of the fuel pump 4. As shown in FIGS. 2 to 4, since the outlet port 16a of the return piping 16 is projected upwardly to the interior of the sub-tank 5 through the set plate 3, the flow path for the extra fuel is provided for the bottom surface of the sub-tank 5 after it is once returned downwardly within the flow guide means 18. An opening 18a as a blow-out port is provided at a position in the vicinity of the suction port 4a toward the suction port 4a of the fuel pump. The extra fuel from the opening 18a is caused to flow toward the suction port 4a of the fuel pump 4a, i.e., so as to flow to the suction side filter 6 in this embodiment.

In the thus constructed fuel feeding device for automotive vehicle, even if the fuel 2 is biased on one side within the sub-tank 5 by the abrupt acceleration, the abrupt braking and the slant of the vehicle when the amount of the fuel 2 within the fuel reservoir 1 is small, the return fuel which is the extra fuel from the pressure regulator 13 is discharged from the opening 18a toward the suction side filter 6 within the sub-tank 5, i.e., the suction port 4a of the fuel pump 4. Accordingly, the extra fuel is always fed to the suction port 4a. As a result, it is possible to feed the fuel to the engine by the fuel pump 4.

Embodiment 2

Figure 5:
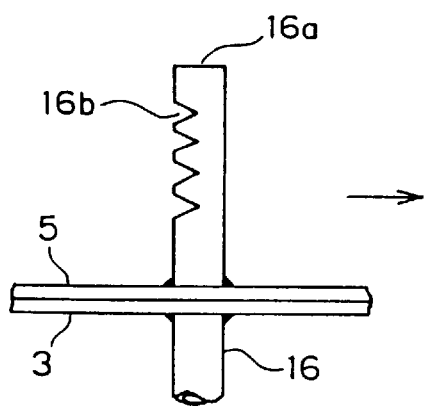
FIG. 5 is a side elevational view showing a flow guide means before shaping according to an embodiment 2.
Figure 6:
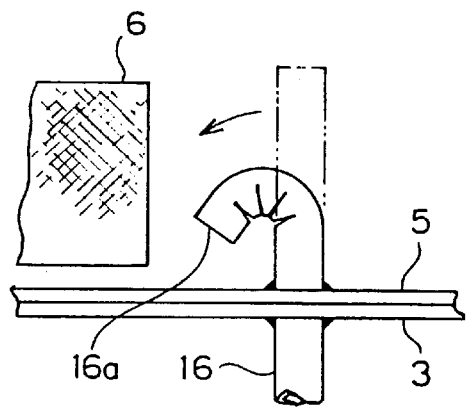
FIG. 6 is a side elevational view showing a flow guide means after shaping according to the embodiment 2.

An embodiment 2 shown in FIGS. 5 and 6 is an example in which a pipe portion adjacent to the outlet port 16a of the return piping 16 is machined to form a flow guide means in contrast to the structure in which the flow guide means according to the above-described embodiment 1 is formed as a separate member. A part of the side portion of the pipe wall of the return piping 16 is cut out and the pipe is bent to the side portion thereof so that the outlet port 16a of the return piping 16 is directed to the suction portion 4a of the fuel pump 4.

The flow guide means will now be described with reference to FIGS. 5 and 6. In the drawings, reference numerals 3, 5, 6 and 16 are used to indicate the same components as those in the embodiment 1 and explanation therefor will be omitted.

By the way, reference character 16b in the drawings denotes a plurality of V-shaped cutaways which are obtained by cutting away in several stages in the lateral direction the outlet port 16a side of the return piping 16 projecting into the sub-tank 5, i.e., the part of the pipe wall side portion adjacent to the end thereof. The V-shaped cutaways 16b are cut so that the grooves are opened in a direction in which the suction port 4a of the fuel pump 4, i.e., the suction filter 6 is present. Then, as shown in FIG. 6, the return piping 16 is bent so that an opening defined by each V-shaped cutaway 16b is closed. The outlet port 16a of the return pipe 16 is directed close to the suction port 4a.

If the flow guide means is thus formed, a separate special member is not needed for the flow guide means. Accordingly, it is possible to form the device in low cost.

In such an arrangement, the effect of discharging the extra fuel toward the suction port 4a of the fuel pump 4 is the same as that of the above-described structure 1.

Embodiment 3

Figure 7:
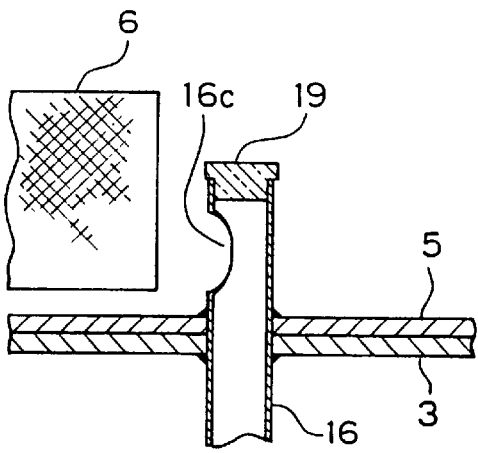
FIG. 7 is a side elevational view showing a flow guide means according to an embodiment 3.
Figure 8:
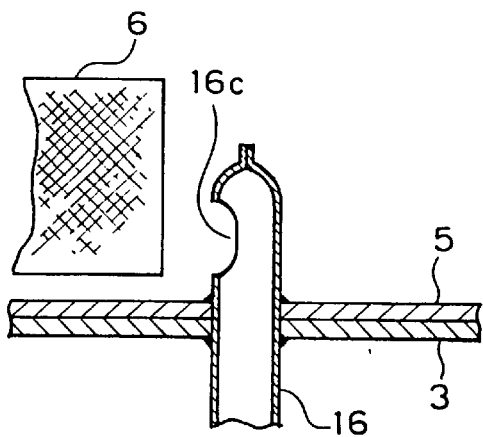
FIG. 8 is a side elevational view showing another flow guide means according to the embodiment 3.

Also, in the same manner as in the above-described embodiment 2, an embodiment 3 shown in FIGS. 7 and 8 is an example in which the pipe wall adjacent to the outlet port 16a of the return piping 16 is machined to form the flow guide means. In the flow guide means, a lateral outlet 16c directed to the suction port 4a of the fuel pump 4 is formed in the side wall portion adjacent to the outlet 16a of the return piping 16, and the terminal outlet 16a of the return piping 16 is closed. Incidentally, in the drawings, reference numerals 3, 5, 6 and 16 are used to indicate the same components as those in the above-described embodiment 1 and explanation therefor will be omitted.

First of all, in FIG. 7, reference character 16c in the drawings denotes an opening machined by cutting the pipe wall of the terminal portion of the return piping 16 extending into the sub-tank 5. This opening 16c is located close to the suction port 4a of the fuel pump 4 and directed thereto. Incidentally, reference numeral 19 denotes a closing plug and is pressingly fit into the terminal outlet port of the return piping 16, i.e., the intrinsic outlet port 16a opened in an axial direction of the pipe to close the outlet port 16a.

Next, FIG. 8 shows another flow guide means different from that shown in FIG. 7. In this example, the terminal end of the return piping 16 is pressed and closed instead of the closing plug 19 shown in FIG. 7. Also in this example, the effect of discharging the extra fuel toward the suction port 4a of the fuel pump 4 is the same as that of the above-described embodiment 1.

Embodiment 4

Figure 9:
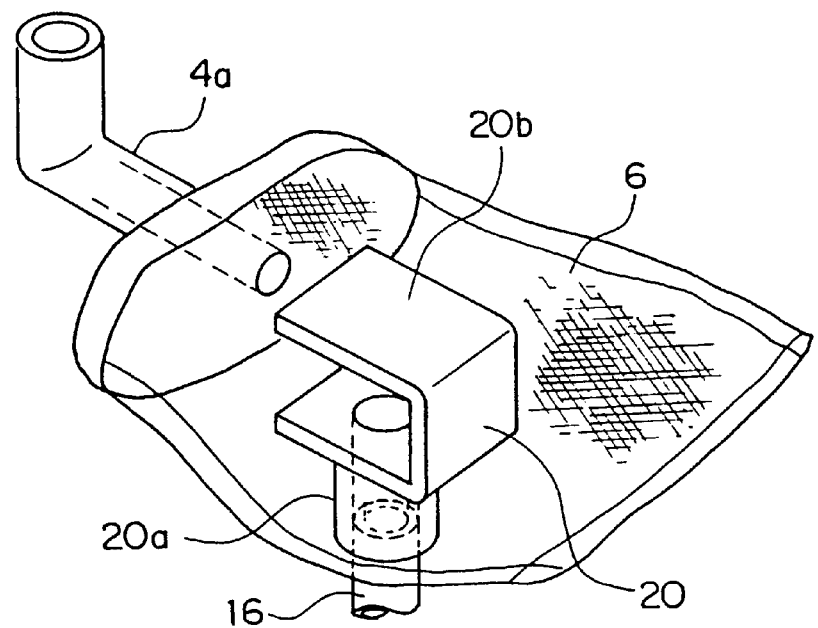
FIG. 9 is a perspective view showing a flow guide means according to an embodiment 4.
Figure 10:
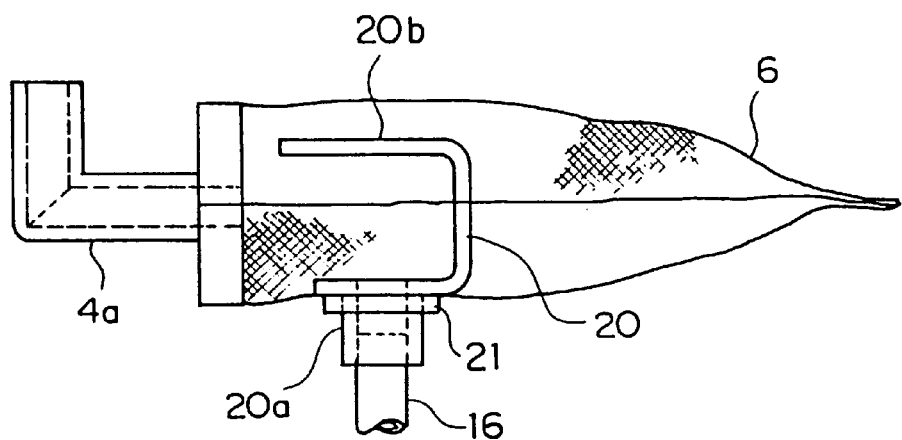
FIG. 10 is a side elevational view showing a flow guide means according to the embodiment 4.
Figure 11:
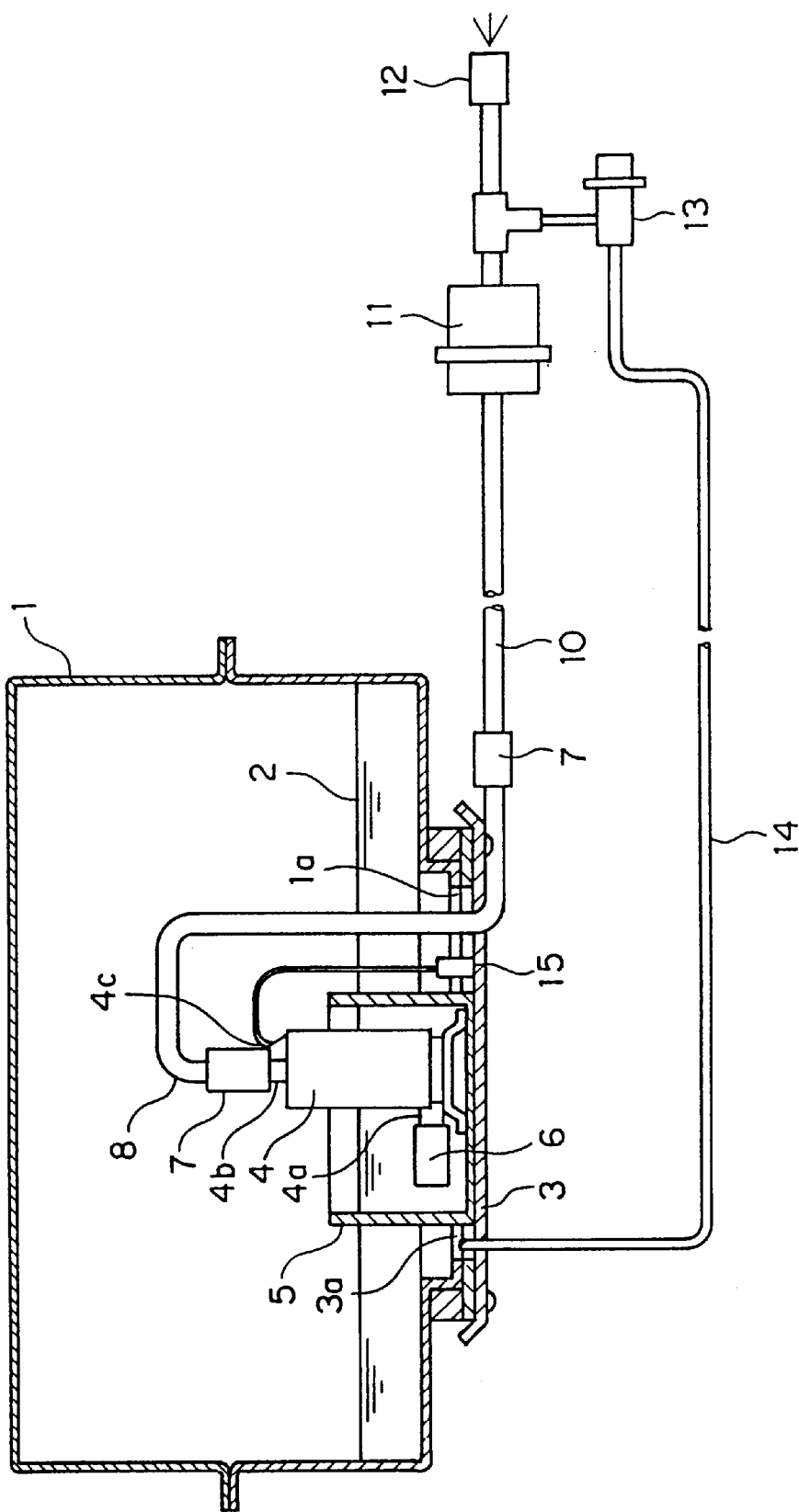
FIG. 11 is a cross-sectional view showing a conventional fuel feeding device for an automotive vehicle.

In an embodiment 4 shown in FIGS. 9 and 10, the flow guide means 20b which is formed as a member is provided in the interior of the suction side filter 6 formed to cover the suction port 4a of the fuel pump 4.

FIG. 9 is a perspective view showing the flow guide means and FIG. 10 is a side view thereof. In the drawings, reference numerals 4a, 6 and 16 are used to indicate the same components as those in the above-described embodiment 1 and explanation therefor will be omitted.

In the drawings, reference numeral 20 denotes the flow guide means as a member. This flow guide means 20 is connected terminal outlet portion 16a of the return piping 16, passes through a mesh portion of the suction side filter 6 and is provided with a communication pipe 20a formed so that the outlet is located within the suction filter 6 and a guide wall 20b formed in a U-shaped so that the extra fuel from the outlet of the communication pipe 20a is directed to the suction port 4a of the fuel pump 4.

Then, in this example, since the guide wall 20b as a member is disposed within the suction side filter 6 formed in the mesh form, the flow guide means 20 serves also as an intermediate support member for preventing the crash of the suction side filter 6. Incidentally, numeral 21 in the drawing denotes a collar for mounting the flow guide means 20 on the suction side filter 6 while sealing the communication pipe 20a to the mesh portion of the suction side filter 6.

As described above, by providing the flow guide means or providing a part thereof within the suction side filter 6, the outlet port 16a for the extra fuel and the suction port 4a of the fuel pump 4 are located closer to each other. Accordingly, it is very effective to compensate for the deficiency of the fuel in the vicinity of the suction port 4a of the fuel pump 4.

Also, in this embodiment 4, the effect of discharging the extra fuel toward the suction port 4a of the fuel pump 4 is the same as that of the above-described embodiment 1.

Also, in this embodiment 4, since the extra fuel to be returned into the interior of the suction side filter 6 is passed through the suction side filter 6 and the fuel filter 11 so that the dust is removed therefrom, the re-feeding of the extra fuel within the suction side filter 6 by the fuel pump 4 suppress the clogging of the suction side filter 6 and the fuel filter 11 to thereby prolong the service life of the filters.

Industrial Applicability

According to the fuel feeding device for automotive vehicle having the first structure of the present invention, when the amount of the fuel within the fuel reservoir is small, even if the fuel is biased in the sub-tank by the abrupt acceleration, the abrupt braking and the slant of the vehicle, the return fuel which is the extra fuel from the pressure regulator is efficiently guided from the opening to the suction side filter within the sub-tank, i.e., toward the suction port of the fuel pump. Accordingly, the return fuel is always fed to the suction port. Accordingly, it is possible to stably continue the feeding of the fuel to the engine by the fuel pump.

According to the fuel feeding device for automotive vehicle having the second structure of the present invention, in addition to the advantages of the fuel feeding device for automotive vehicle having the first structure, since the return piping and its outlet are provided in concentration on the set plate together with the sub-tank, the fuel pump and its suction port, it is convenient to produce the device or to perform the maintenance and inspection.

According to the fuel feeding device for automotive vehicle having the third and fourth structures of the present invention, the extra fuel is effectively concentrated on the suction port of the fuel pump by the flow guide means.

According to the fuel feeding device for automotive vehicle having the fifth to eight structures of the present invention, since any special member is not needed as the flow guide means, it is possible to produce the device in low cost. In addition, the extra fuel can be efficiently concentrated on the suction port of the fuel pump by the flow guide means.

According to the fuel feeding device for automotive vehicle having the ninth and tenth structures of the present invention, since the flow guide means is provided within the suction side filter, the outlet of the extra fuel and the suction port of the fuel pump can be located closer with each other, and it is very effective to compensate for the deficiency of the fuel in the vicinity of the suction port of the fuel pump.

Also, the effect of guiding the extra fuel to the suction port of the fuel pump is the same as that of the first structure of the invention.

Furthermore, in this arrangement, since the extra fuel to be returned into the interior of the suction side filter is passed through the suction side filter and the fuel filter so that the dust is removed therefrom, the re-feeding of the extra fuel within the suction side filter by the fuel pump suppress the clogging of the suction side filter and the fuel filter to thereby prolong the service life of the filters.

What is claimed is:

1. An in-tank type fuel feeding device for an automotive vehicle, comprising:
   a sub-tank provided within a fuel reservoir;
   a fuel pump disposed within the sub-tank for feeding under pressure the fuel within the fuel reservoir through a pressure regulator, the fuel pump having a suction port;
   a return piping for returning extra fuel from the pressure regulator to the fuel reservoir, the return piping having an outlet port disposed within the sub-tank; and
   a flow guide covering the outlet port, the flow guide operative to guide and direct the extra fuel to the suction port.

2. The fuel feeding device for an automotive vehicle according to claim 1, characterized in that the flow guide is provided inside of a suction side filter formed so as to cover the suction port of the fuel pump.

3. The fuel feeding device for an automotive vehicle according to claim 1, wherein the flow guide is shaped to be operative to cause the flow of the extra fuel upwardly exiting the outlet port to be returned downwardly within the flow guide.

4. The fuel feeding device for an automotive vehicle according to claim 3, wherein the flow guide further comprises a blow-out port operative to cause the flow of the extra fuel that has been returned downwardly to then exit the flow guide toward the suction port.

5. The fuel feeding device for an automotive vehicle according to claim 4, wherein the blow-out port is disposed on a side of the flow guide essentially perpendicular to the flow direction of the extra fuel upwardly exiting the outlet port.

6. The fuel feeding device for an automotive vehicle according to claim 1, wherein the sub-tank is cup-shaped.

7. The fuel feeding device for an automotive vehicle according to claim 1, wherein the flow guide is attached to the outlet port of the return piping.

8. An in-tank type fuel feeding device for an automotive vehicle, comprising:
   a sub-tank provided within a fuel reservoir;
   a fuel pump disposed within the sub-tank for feeding under pressure the fuel within the fuel reservoir through a pressure regulator, the fuel pump having a suction port;
   a return piping for returning extra fuel from the pressure regulator to the fuel reservoir, the return piping having an outlet port disposed within the sub-tank; and
   a set plate mounted to the sub-tank, the set plate disposed so that the sub-tank and the fuel pump are positioned at appropriate positions within the fuel reservoir from a bottom surface side of the fuel reservoir,
   wherein the return piping passes through the set plate from the bottom surface side of the fuel reservoir to face an interior of the sub-tank, and the outlet port of the return piping is provided so that the extra fuel is guided and directed to the suction port of the fuel pump.

9. The fuel feeding device for an automotive vehicle according to claim 8, further comprising a flow guide covering the outlet port, the flow guide operative to guide the extra fuel to the suction port of the fuel pump.

10. The fuel feeding device for an automotive vehicle according to claim 9, characterized in that the flow guide is provided inside of a suction side filter formed so as to cover the suction port of the fuel pump.

11. The fuel feeding device for an automotive vehicle according to claim 9, wherein the flow guide is attached to the outlet port of the return piping.

12. fuel feeding device for an automotive vehicle according to claim 8, characterized in that a part of a pipe wall side portion of the return piping is cut out and the pipe is bent on the side of the side wall portion so that the outlet port of the return piping is directed to guide the extra fuel to the suction port of the fuel pump.

13. The fuel feeding device for an automotive vehicle according to claim 8, characterized in that a lateral outlet port directed to guide the extra fuel to the suction port of the fuel pump is provided in a pipe wall side portion adjacent to the outlet port of the return piping, and the outlet port of the return piping is closed.

14. An in-tank type fuel feeding device for an automotive vehicle, comprising:
 a sub-tank provided within a fuel reservoir containing fuel;
 a fuel pump disposed in the sub-tank for feeding fuel under pressure to a pressure regulator on an engine side, the fuel pump having a suction port; and
 a return piping for returning extra fuel from the pressure regulator to the fuel reservoir, the return piping having an outlet port disposed within the sub-tank;
 wherein a part of a pipe wall side portion of the return piping is cut out and the pipe is bent on the side of the side wall portion so that the outlet port of the return piping is directed to guide the extra fuel to the suction port of the fuel pump.

15. An in-tank type fuel feeding device for an automotive vehicle, comprising:
 a sub-tank provided within a fuel reservoir containing fuel;
 a fuel pump disposed in the sub-tank for feeding fuel under pressure to a pressure regulator on an engine side, the fuel pump having a suction port; and
 a return piping for returning extra fuel from the pressure regulator to the fuel reservoir, the return piping having an outlet port disposed within the sub-tank;
 wherein a lateral outlet port directed to guide the extra fuel to the suction port of the fuel pump is provided in a pipe wall side portion adjacent to the outlet port of the return piping, and the outlet port of the return piping is closed.

* * * * *